(12) United States Patent
Sadow et al.

(10) Patent No.: US 6,302,250 B1
(45) Date of Patent: *Oct. 16, 2001

(54) TOWABLE CARRYING CASE

(75) Inventors: Bernard D. Sadow, Chappaqua, NY (US); Jeffrey A. Schwab, Weston, CT (US)

(73) Assignee: Outrigger, Inc., Chappaqau, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,571

(22) Filed: Jan. 30, 1998

Related U.S. Application Data

(63) Continuation-in-part of application No. 09/005,313, filed on Jan. 9, 1998, which is a continuation-in-part of application No. 08/871,472, filed on Jun. 9, 1997.

(51) Int. Cl.$^7$ .................................................... A45C 13/00
(52) U.S. Cl. ...................... 190/18 A; 190/115; 190/18 R; 190/127; 280/37
(58) Field of Search .................................. 190/18 A, 115, 190/127, 18 R; 280/37

(56) References Cited

U.S. PATENT DOCUMENTS

| | | | |
|---|---|---|---|
| 760,356 | * 5/1904 | Taylor | 190/40 |
| 930,032 | * 8/1909 | Billburg et al. | 190/108 |
| 2,042,387 | 5/1936 | Cobb . | |
| 2,392,926 | 1/1946 | Kelly . | |
| 2,510,754 | * 6/1950 | Norlin | 190/18 A |
| 4,284,287 | 8/1981 | Esposito . | |
| 4,286,796 | 9/1981 | Esposito . | |
| 4,374,555 | * 2/1983 | March | 190/48 |
| 4,407,521 | 10/1983 | Zeitlin . | |

(List continued on next page.)

FOREIGN PATENT DOCUMENTS 2124589   2/1984   (GB) .

Primary Examiner—Allan N. Shoap
Assistant Examiner—Tri M. Mai
(74) Attorney, Agent, or Firm—Abelman, Frayne & Schwab

(57) ABSTRACT

An article of towable luggage has ground engagable wheels mounted on the major front or rear wall, to permit towing of said article of luggage over a ground surface with the selected wall in proximity to and presented to the ground surface, the article of towable luggage being towable by a towing strap attached to said article of towable luggage, or by a handle having telescopic legs pivotally attached to the article of luggage, the telescopic legs of the handle in the alternative being telescopically received within the body of the article of luggage, the respective legs including hinges permitting the handle to be raised and lowered relative to the article of luggage.

16 Claims, 10 Drawing Sheets

U.S. PATENT DOCUMENTS

| | | |
|---|---|---|
| 4,460,188 | 7/1984 | Maloof . |
| 4,550,813 | 11/1985 | Browning . |
| 4,756,394 | 7/1988 | Cohen . |
| 4,771,871 * | 9/1988 | Lambracht .......................... 190/18 A |
| 4,792,025 | 12/1988 | Thomas . |
| 4,813,520 | 3/1989 | Lin . |
| 4,889,360 | 12/1989 | Havlovitz . |
| 4,890,705 * | 1/1990 | Pineda ................................ 190/18 A |
| 4,921,270 | 5/1990 | Schoberg . |
| 4,951,818 * | 8/1990 | Johnson ............................. 190/18 A |
| 4,966,259 | 10/1990 | Bergman . |
| 5,108,119 * | 4/1992 | Huang ................................ 190/18 A |
| 5,116,289 | 5/1992 | Pond et al. . |
| 5,127,662 | 7/1992 | Spak . |
| 5,154,265 | 10/1992 | Capistrant . |
| 5,165,508 | 11/1992 | Kim . |
| 5,181,590 * | 1/1993 | Carpenter et al. ............... 190/127 X |
| 5,197,580 * | 3/1993 | Berman et al. .................. 190/127 X |
| 5,207,440 | 5/1993 | Liang . |
| 5,323,887 * | 6/1994 | Scicluna et al. ................... 190/18 A |
| 5,335,759 * | 8/1994 | Yeh ...................................... 190/115 |
| 5,351,792 * | 10/1994 | Cohen ................................ 190/18 A |
| 5,377,795 * | 1/1995 | Berman ........................... 190/115 X |
| 5,407,039 | 4/1995 | Alper et al. . |
| 5,431,428 * | 7/1995 | Marchwiak et al. ............... 190/18 A |
| 5,524,737 * | 6/1996 | Carpenter et al. ............... 190/127 X |
| 5,542,510 * | 8/1996 | Rekuc et al. ....................... 190/18 A |
| 5,553,692 * | 9/1996 | Sheiman .............................. 190/18 A |
| 5,566,797 * | 10/1996 | Van Himbeeck .................. 190/18 A |

* cited by examiner

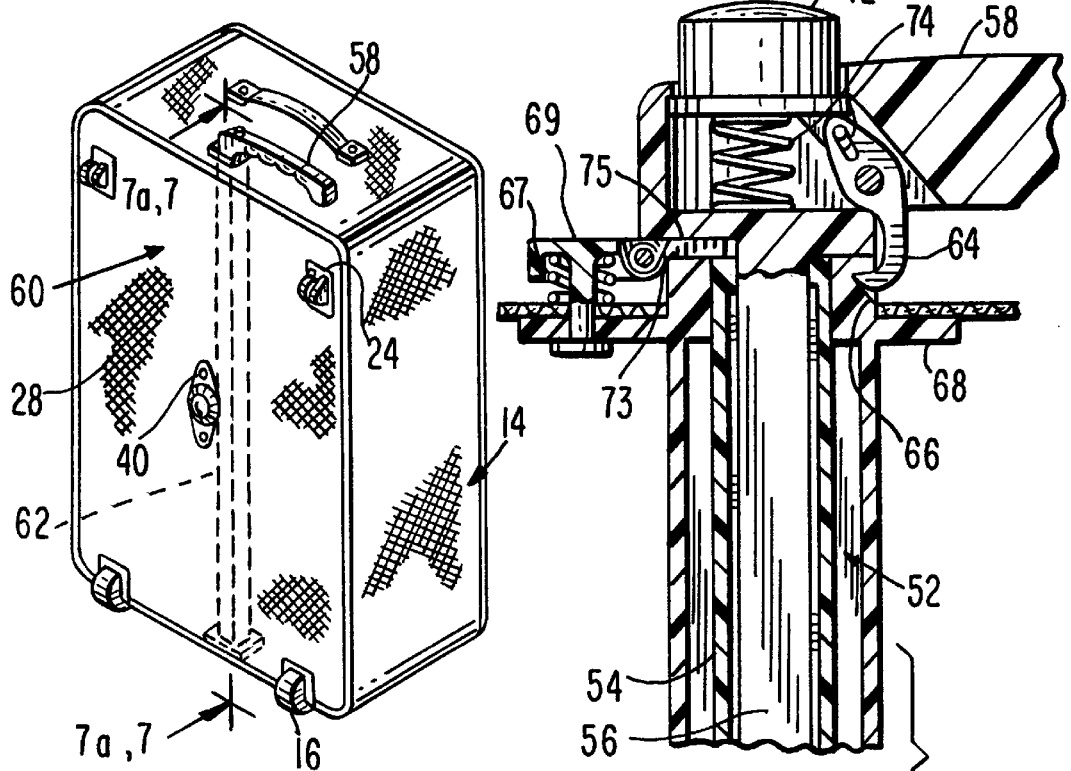
FIG. 6
FIG. 7
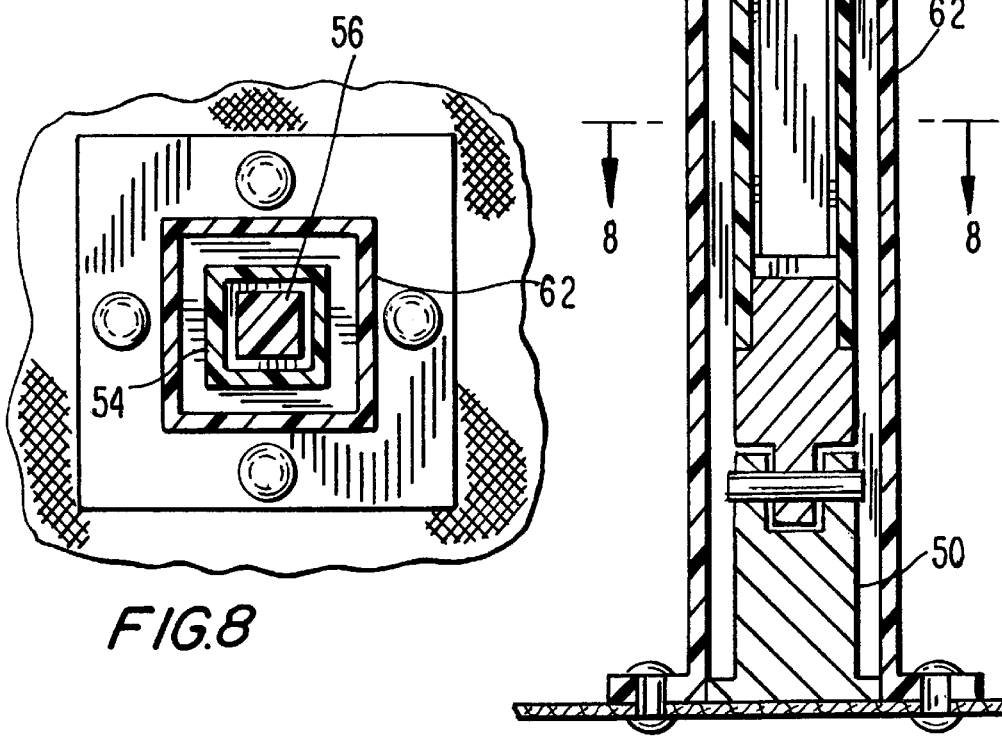
FIG. 8

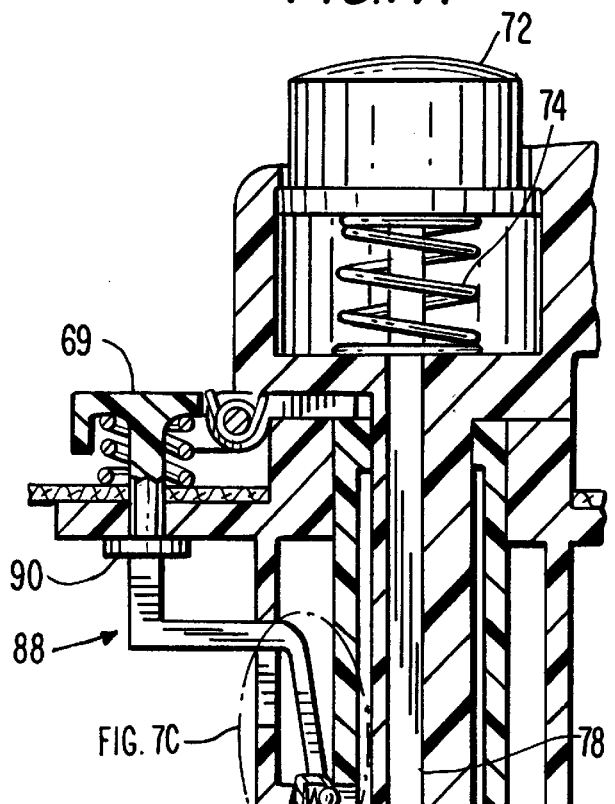
FIG.7A
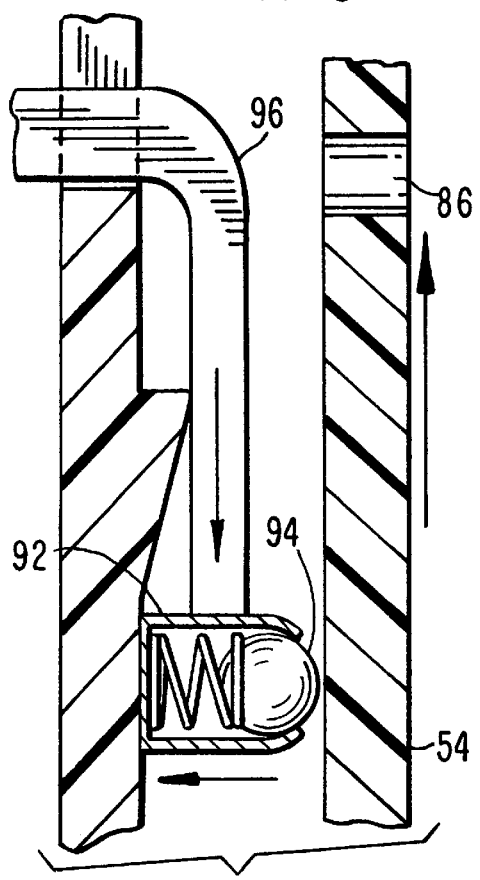
FIG.7C
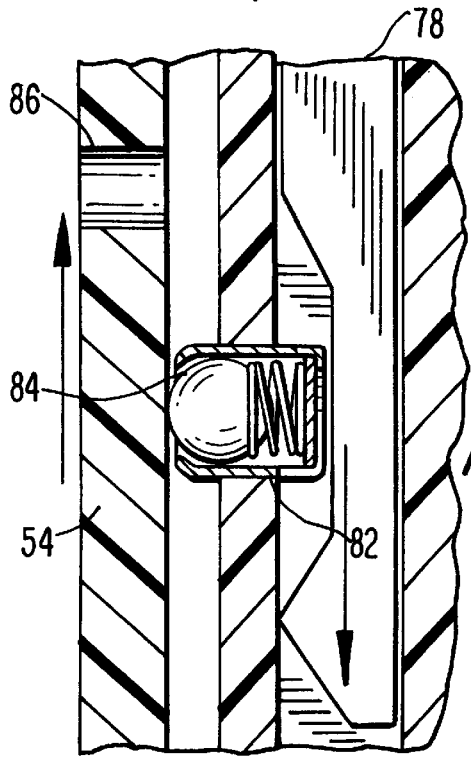
FIG.7B
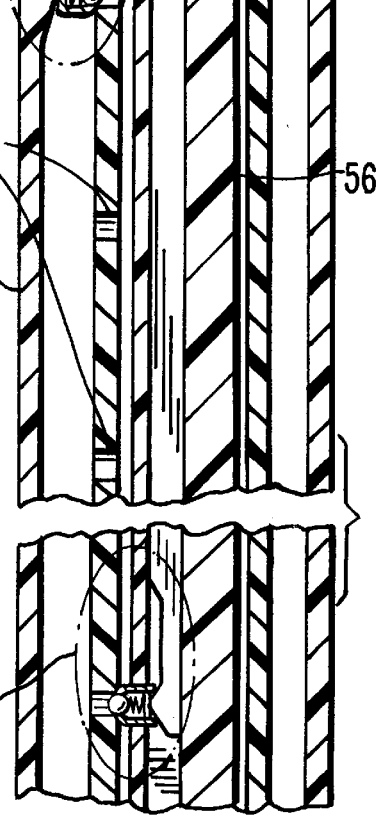

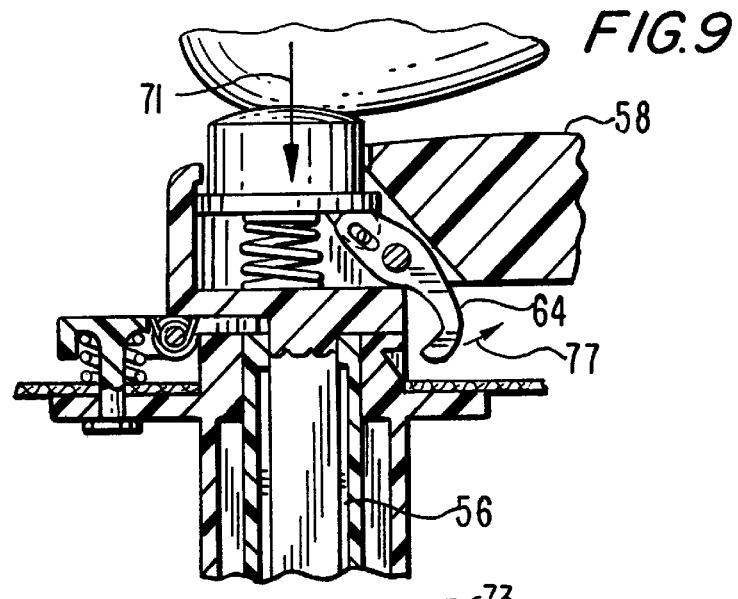
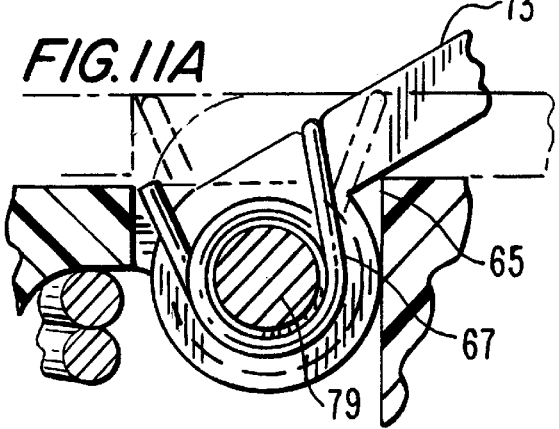
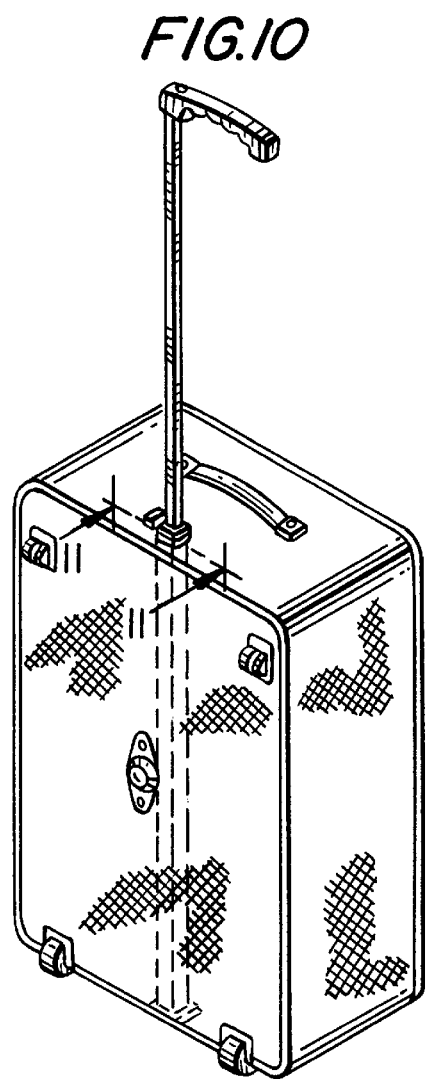
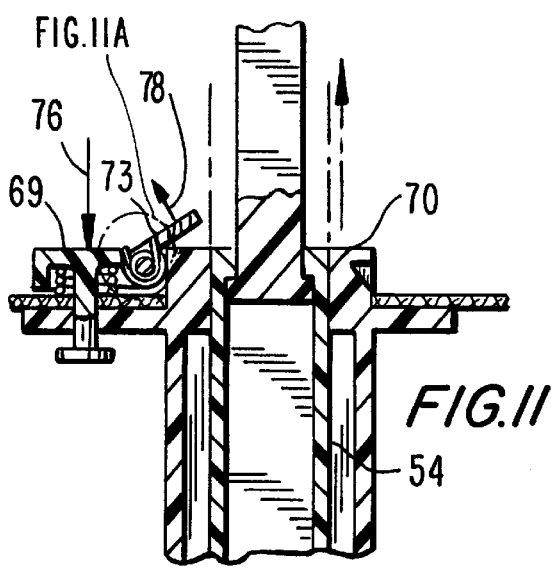

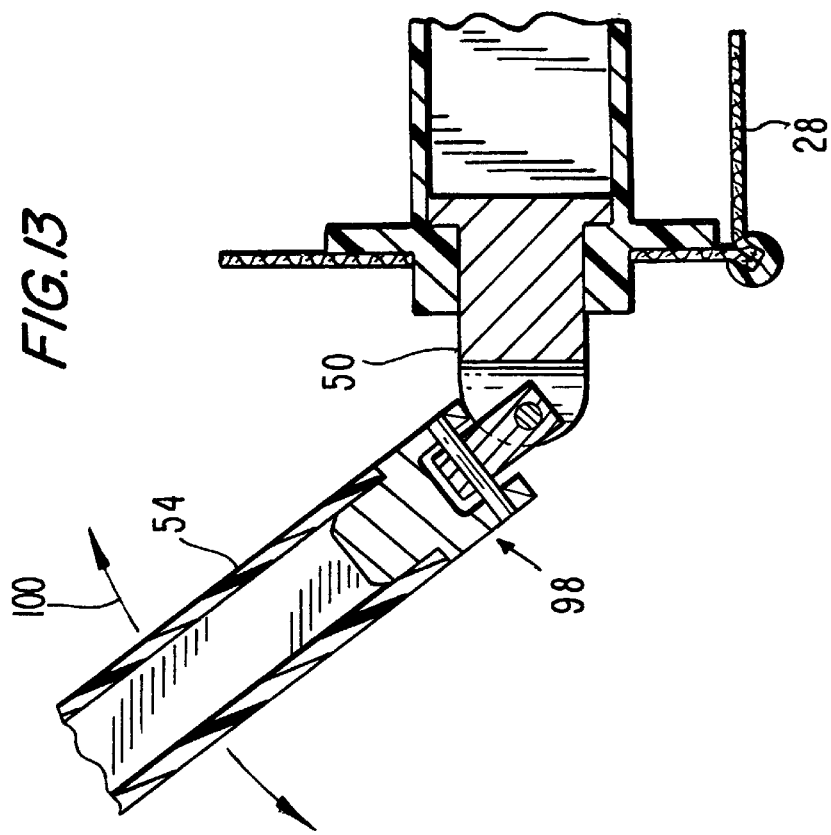
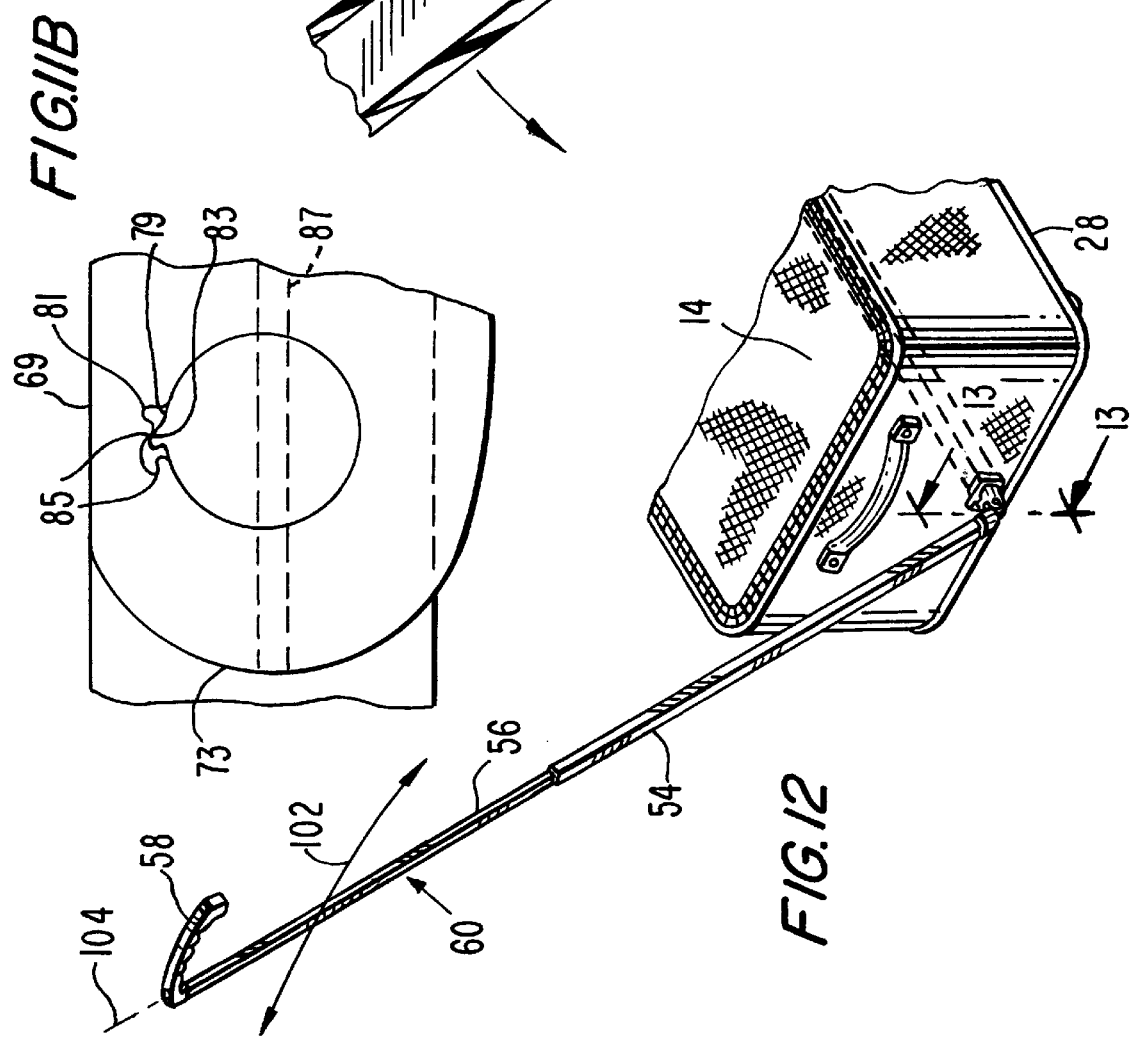

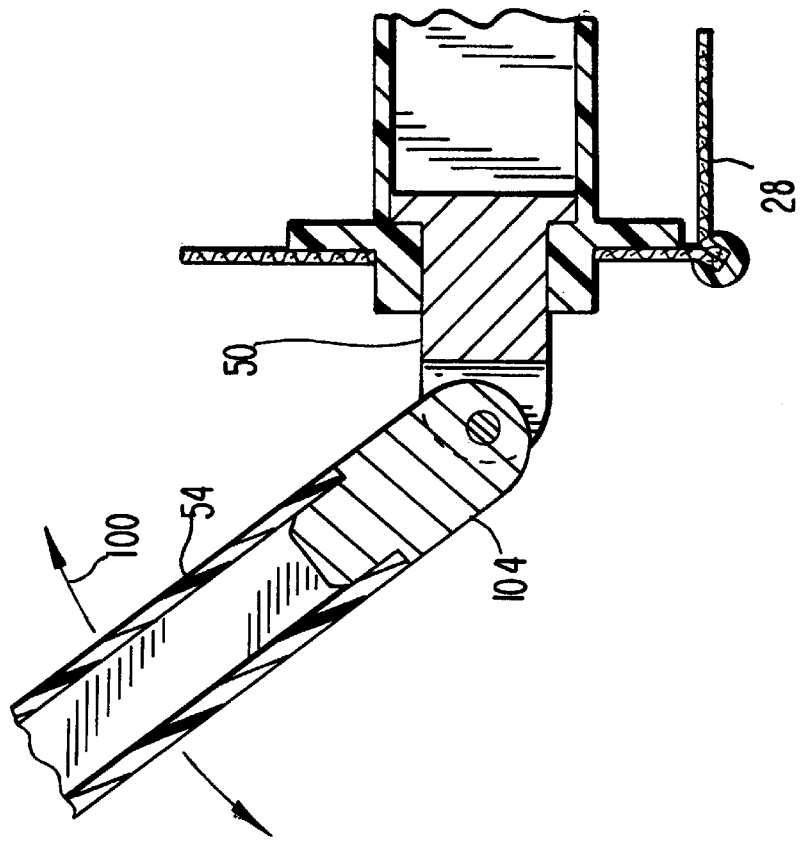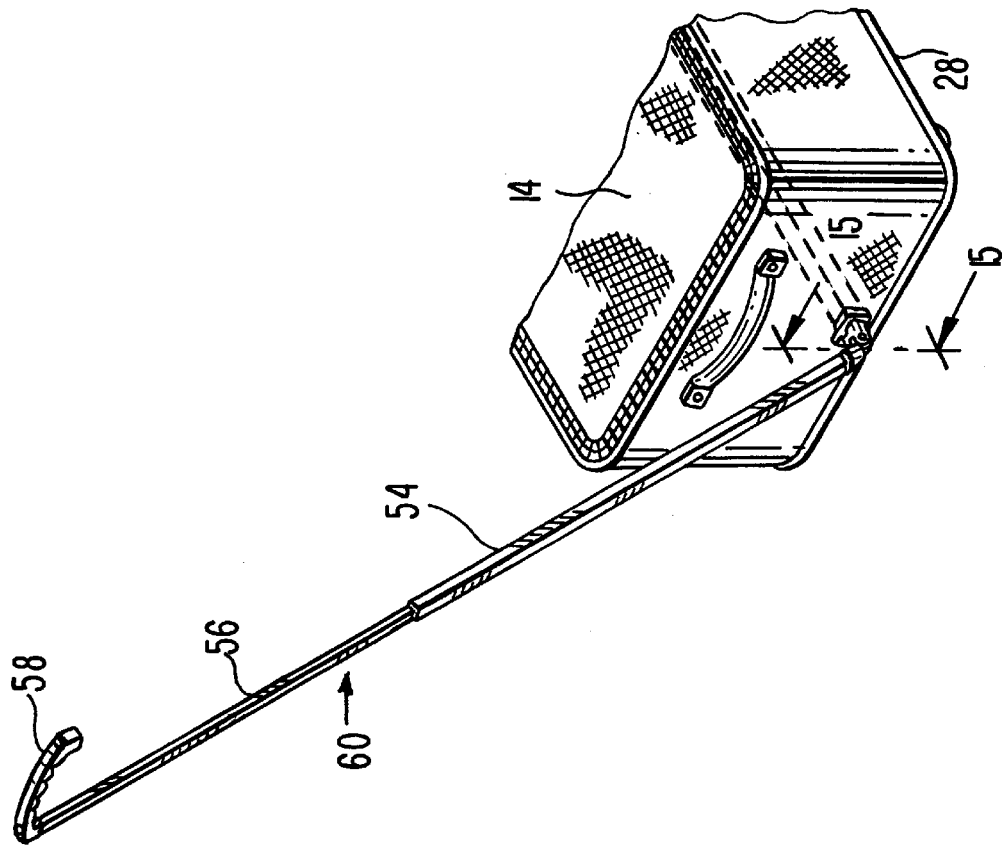

TOWABLE CARRYING CASE

CROSS-REFERENCE TO RELATED APPLICATIONS

This application is a continuation-in-part of our copending application Ser. No. 09/005,313, filed on Jan. 9, 1998, which is a continuation-in-part of our copending application Ser. No. 08/871,472, filed on Jun. 9, 1997.

FIELD OF THE INVENTION

This invention relates to articles of luggage in the form of suitcases or carrying cases, as commonly used by airlines' passengers or other travelers for the transportation of clothing and personal effects.

BACKGROUND OF THE INVENTION

Commonly known wheeled carrying cases include a substantially rigid frame providing side walls of the case, and front and rear major walls that are supported by the frame, at least one of the major walls including a zippered attachment to adjacent ones of the side walls.

Wheeled carrying cases are also well known in the art that include a handle that can be telescopically extended, or retracted into, the body of the case at one of the side walls thereof, and, wheels provided at the opposite side wall of the case that can roll over a ground surface, such as the floor of an airport terminal, or, a passenger aisle of an aircraft.

While this arrangement is admirable for relatively small articles of luggage, it poses a problem in the event that a large and heavily loaded article of luggage is involved.

While such large and heavy articles of luggage easily can be stored in the luggage compartment of an automobile or other form of conveyance, when it is necessary to transport the article of luggage to some other location, a problem arises in providing adequate stability for the article of luggage when being wheeled on a ground surface, this being due to the fact that during wheeling of the article of luggage, the article of luggage must be held in an inclined position. In that position, the center of gravity of the case is displaced laterally of the ground engaging wheels, is located between the handle and the ground engaging wheels.

This can constitute a source of discomfort to the person towing the article of luggage, who is then required to exert sufficient force to support the handle, which at the time the article of luggage is positioned in the inclined position relative to the vertical for towing, can exert a considerable downwards force on the handle, that downwards force being resisted by the grasp of the user's hand.

Further, depending on the physical height of the person towing the article of luggage, the condition exists that a relatively shorter person will be subjected to a much greater force, due to the greater inclination relative to the vertical of the article of luggage and the fixed position of the handle relative to the article of luggage, than would be a taller person, who conveniently can hold the article of luggage at a lesser angle of inclination relative to the vertical during towing of the article of luggage.

As will be appreciated, the wheels on which the article of luggage is towed act as a fulcrum about which the article of luggage angles relative to the vertical when moved from the vertical position to the inclined towing position. Further, the greater the angle of inclination relative to the vertical, the greater becomes the spacing of the center of gravity relative to the towing wheels providing the fulcrum, the center of gravity then being displaced laterally of the vertical and laterally of the axis of the ground engaging wheels.

One manner of reducing this problem would be for the user to have packaged all heavy articles at the bottom of the article of luggage and in proximity to the towing wheels, the remainder of the case being occupied by relatively light weight articles. This, however, does not normally occur during the packaging of the article of luggage by the user. If relatively heavy articles are packaged in that end of the article of the luggage remote from the towing wheels, then, the center of gravity of the packaged article of luggage becomes even more displaced relative to the vertical plane including the axes of the towing wheels.

If the handle of the case should slip out of the grasp of the user's hand, then, the only possible situation is that the article of luggage, and its contained articles will crash downwardly onto the supporting ground surface, this resulting in possible damage to the articles stored within the article of luggage.

Another problem often encountered by travelers is having to deal with multiple articles of luggage. Even if both have wheels, it is very cumbersome to attempt to tow (or push) more than one article of luggage at a time. As well, the ability to stack one article of luggage upon another article of luggage is restricted and also adds significant weight along the extent of the inclined handle of the towed article of luggage.

For this reason, despite the generally recognized advantages of wheeled luggage, there are significant unresolved problems in use which the simple addition of wheels and a handle do not solve.

SUMMARY OF THE INVENTION

The present invention proceeds from the known wheeled article of luggage of the type including a handle extendable, or some other towing implement, from one side wall of the article of luggage and towing wheels provided at an opposite side wall of the article of luggage, and overcomes the problems of the prior art by providing wheels on one of the major front or back walls of the article of luggage that will permit the article of luggage to be towed over a ground engaging surface with the wheeled major wall of the article of luggage in proximity to the ground surface, thus to relieve the user of any forces exerted on the user's hands due to angling of the article of luggage relative to the vertical as is common in prior art constructions. In addition, the article of luggage can readily service as a platform upon which additional articles of luggage or other items can be stacked and conveniently and easily towed.

In one embodiment of the invention, the article of luggage is provided with ground engaging wheels on a major wall of the article of luggage, and an extendable handle of the article of luggage, which instead of being arranged in fixed telescoping relation with the article of luggage and extendable or retractable parallel to the plane of the major walls of the article of luggage, comprises a towing member that is attached to the article of luggage, and which can be extended therefrom into a position convenient for use in towing of the article of luggage.

For example, the towing member can be a flexible strap that can be readily stored within a pocket located on the outer surface of the article of luggage, and which can be withdrawn from that pocket and employed in the manner of a leash for towing the article of luggage at the time the is article of luggage has been laid on its wheeled major wall.

In the alternative, a telescoping handle with a gripping handlebar can be hinged to the article of luggage at the end remote from the handlebar, and which is preferably releasably secured to the article of luggage in the vicinity of the handlebar of the telescoping handle. In this instance, prior to placing the article of luggage on its wheeled major wall, the handle is first released from its attachment to the article of luggage in the vicinity of the handlebar, the telescopic handle is then swung angularly about its pivot at the end of the handle remote from the handlebar, such that it extends beyond the end of the article of luggage. The article of luggage can then be laid on its wheeled major wall. If desired a side mounted carrying handle can be included which permits customary carrying and as well conveniently can be employed for luggage to its operative towing orientation.

Yet another alternative is the inclusion of the telescoping handle which can be extended from the article of luggage a distance sufficient to expose hinges in the telescoping handle, those hinges, when exposed, permitting the handle to be raised and lowered relative to the article of luggage, and thus permit towing of the article of luggage with comfort by a person of any height.

The telescoping handle in this alternative may be lockable at various degrees of extension from the case to accommodate different persons of varying heights. At less than full extension of the telescoping handle, however, the case is only towable in an inclined attitude relative to the ground surface as was previously described with respect to the towing of the case on the towing wheels 16. In addition, the hinge may be of a socket type restricting rotation of the handle substantially within two planes, one plane being substantially perpendicular to the wheeled major wall of the article of luggage when the article of luggage is laid on its major wall and the other plane having an inclination to the horizontal substantially the same as the inclination of the handle to the horizontal. Alternatively, the hinge may be of a socket type restricting rotation substantially within the single plane substantially perpendicular to the wheeled major wall of the article of luggage.

Preferably the wheeled major wall of the article of luggage is provided with one pair of towing wheels that are rotatable about a common fixed axis, and at least one caster wheel that can rotate randomly about a first axis extending perpendicular to the backwall of the article of luggage, and a second axis extending parallel to the backwall of the article of luggage. Preferably two such caster wheels are provided, one at each corner of the substantially rectangular major wall of the article of luggage.

The provision of four wheels to support the article of luggage on its major wall is adequate in the event that the major wall of the article of luggage is substantially rigid. If, however, and as is often the case, the major wall of the article of luggage includes a sheet of a flexible material, such as leather, synthetic leather, or a coated woven fabric, there could then be a tendency of the major wall of the article of luggage to bulge outwardly, particularly when the major wall of the article of luggage is moved into proximity with the supporting ground surface. This can result in abrasion or other damage at the center of the major wall.

To overcome this problem in what is generally referred to as softsided luggage, a roller ball type caster is preferably located at the center of the major wall of the article of luggage that is operative to support the center of the major wall spaced from the engaged ground surface.

The ground-engaging roller ball can be supported within the article of luggage by a suitable frame member that extends parallel to the major wall of the article of luggage, and which, preferably, for lightness in weight, is in the form of an X-frame that provides a support for the roller s ball at the intersection of the arms of the X-frame, and which also provides supports at the ends of the arms of the X-frame for the roller wheels or casters.

Access to the interior of the article of luggage can be provided at that wall of the article of luggage that is opposite to the wheeled major wall, or, the wheeled major wall can be detachably attached to the side walls of the case.

In addition, not only can the article of luggage be placed on a ground surface with the wheeled major wall of the article of luggage presented to the ground surface in preparation for towing of the article of luggage across the ground engaging surface, but also, the article of luggage, which is already loaded with its contents, can be employed as a wheeled pallet usable in the transportation of further articles of luggage, such as carry-on cases, hand baggage, carrier bags, or any other items needing transport by the user.

DESCRIPTION OF THE DRAWINGS

The invention will now be described with respect to the accompanying drawings, which illustrate preferred embodiments of the invention, and, in which;

FIG. 6 is a frontal perspective view of a wheeled carrying case with a hinged extendible handle similar to that shown in FIG. 4, the handle being in a fully retracted position, except that the hinged handle is a linear member and is lockably adjustable in its desired extension.

FIG. 7 is a cross-sectional view of FIG. 6 taken along section lines 7—7.

FIG. 7A is a partial cross-sectional view of FIG. 6 taken along section lines 7A—7A.

FIG. 7B is an enlarged detail of the area indicated in FIG. 7A.

FIG. 7C is an enlarged detail of the area indicated in FIG. 7A.

FIG. 8 is a view of FIG. 7 taken along section lines 8—8 in FIG. 7.

FIG. 9 is an enlarged view of a portion of FIG. 7 showing the condition when a first button is pressed.

FIG. 10 corresponds to FIG. 6, except that a first telescoping section of the handle has been fully extended.

FIG. 11 is a partial cross-section of FIG. 10 taken along section lines 11—11 in FIG. 10.

FIG. 11A shows an enlarged detail of the portion of FIG. 11 indicated therein.

FIG. 11B is an alternative detail of the area shown in FIG. 11A.

FIG. 12 corresponds to FIG. 6 except that the handle has been fully extended and the case is lying on its back wheeled wall.

FIG. 13 is an enlarged partial cross-section of FIG. 12 taken along section lines 13—13 in FIG. 12.

FIG. 14 corresponds to FIG. 12 except that the hinge of the handle is different from that shown in FIG. 12 and is similar to that shown in FIG. 7.

FIG. 15 is an enlarged partial cross-section of FIG. 14 taken along section lines 15—15 in FIG. 14.

DESCRIPTION OF THE PREFERRED EMBODIMENTS

In each of the embodiments now to be described, it is assumed that in its novel usage described herein the carrying case will be supported on a ground surface 10, such as a side walk, lobby floor, or main hall of an aircraft terminal building or the like.

Figures 1, 1A:
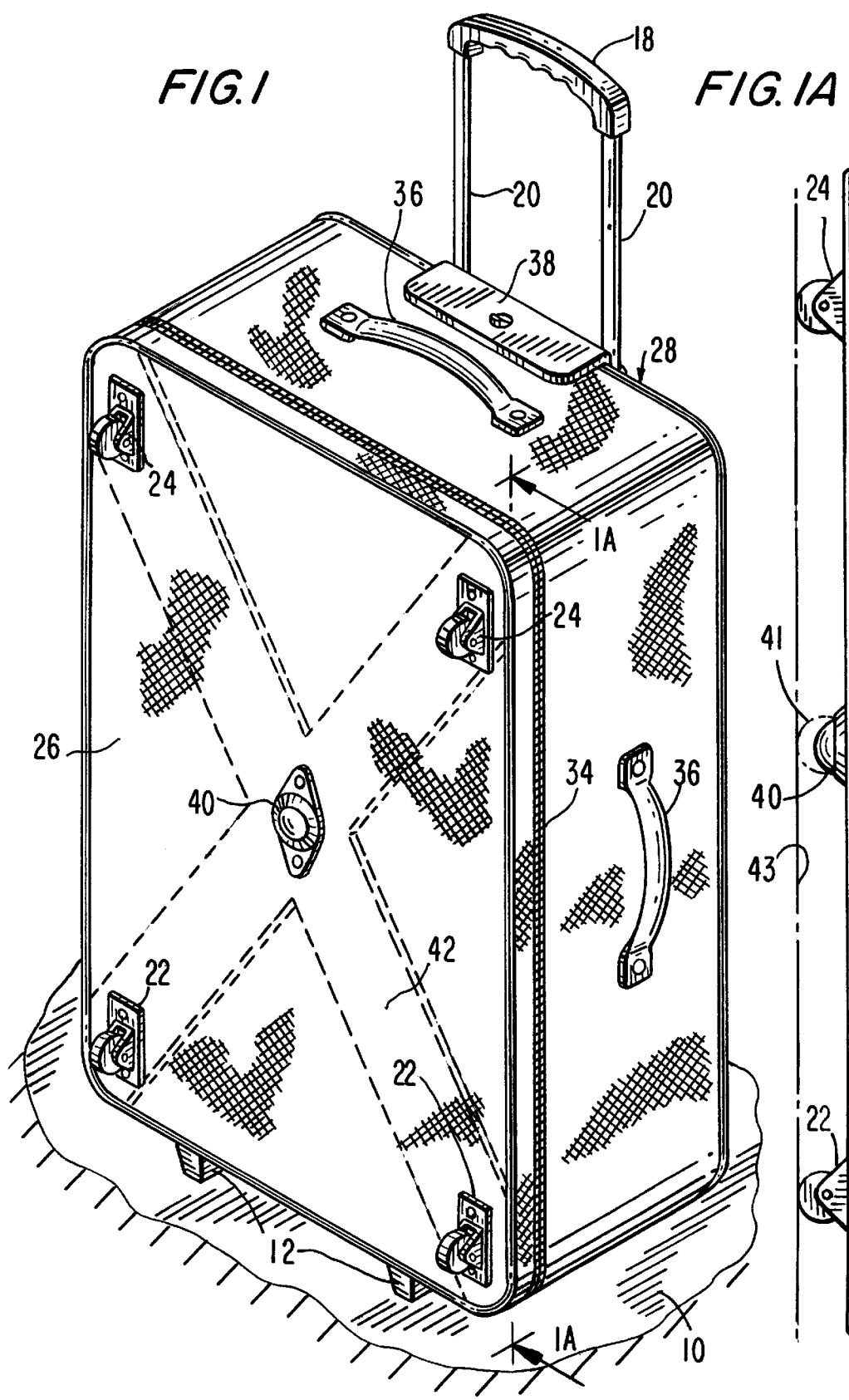
FIG. 1 is a frontal perspective view of the wheeled carrying case of the present invention, when in a vertical position in which it is supported on a ground surface.
FIG. 1A is a view of FIG. 1 taken along section lines 1A—1A.
Figure 3:
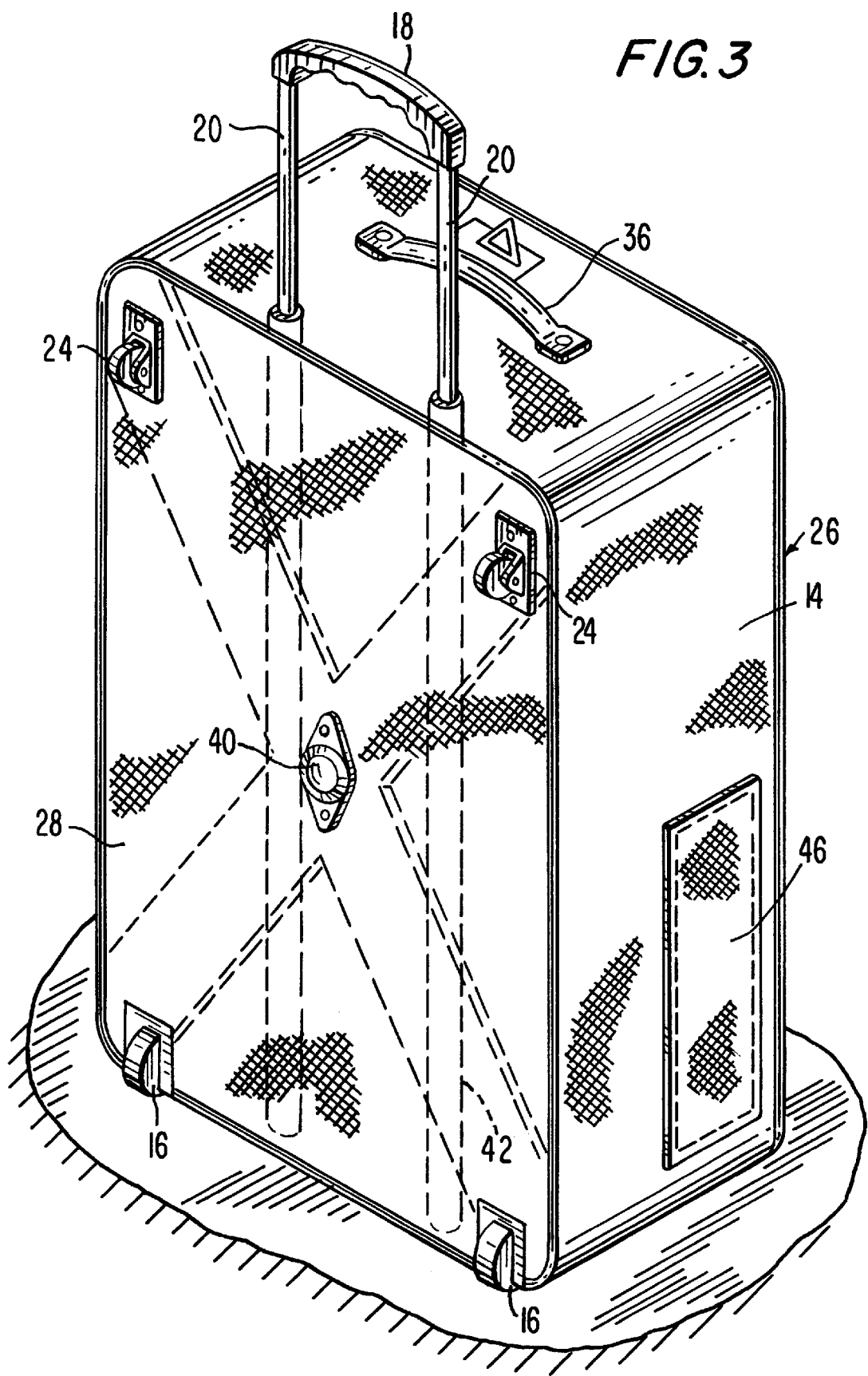
FIG. 3 is a rear perspective view of an alternative form of the wheeled carrying case of FIG. 1.

In FIG. 1, the carrying case of the present invention is shown in a vertical position in which ground-engaging feet 12 of the carrying case 14 are resting on the ground surface 10. If desirable, additional support for the carrying case 14 can be provided by towing wheels 16, as shown in FIG. 3, that are rotatable about a fixed axis, that axis lying in or closely parallel to a plane that includes a major wall of the carrying case, and also the direction of sliding of a handle bar 18 of a telescopic handle having telescopically retractable and extendable legs 20.

As so far described, the carrying case includes those elements that are commonly known in conventional wheeled carrying cases. The user firstly extends the handle bar 18 from the body of the carrying case, and then employs the handle to angle the carrying case from its initial vertical orientation into an inclined position in which it is supported for towing over the ground surface on ground engaging towing wheels 16 as illustrated in FIG. 3.

When the case is fulcrumed about the towing wheels 16 into an inclined attitude relative to the ground surface, the center of gravity of the case moves relative to the axis of the ground wheels, and, depending upon the amount of inclination of the case relative to the vertical, will position itself on the opposite side of a vertical plane that includes the common axis of the ground engaging wheels 16.

It is impossible to predict exactly where the actual center of gravity of the carrying case will be positioned, as this will be entirely dependent upon the weight of the contents of the carrying case and the positioning of is the contents within the carrying case. Depending upon the extent to which the carrying case is angled relative to the vertical, the center of gravity of the carrying case will have passed over a vertical plane including the axis of rotation of the ground engaging towing wheels 16, and, dependent on the amount of inclination of the carrying case relative to the vertical will be spaced from the vertical plane including the axis of rotation of the respective towing wheels 16.

A taller person will have the tendency to move the carrying case to a relatively small inclination relative to the said vertical plane, while a person of lesser height will have angled the carrying case at a greater angle to the said vertical plane, in which event the center of gravity will have moved further away from the said vertical plane, and, the downwards force exerted on the handlebar 18 will have been considerably increased.

If the user at that time loses or releases his or her grasp on the handlebar 18, then, the carrying case will crash onto the ground engagable surface, with possible damage to the stored contents of the crying case.

Where size, weight and the need for transporting additional items are issues, the present invention teaches the addition or substitution of additional ground-engagable wheels 22 and 24 mounted on one of the walls of the carrying case.

Figure 2:
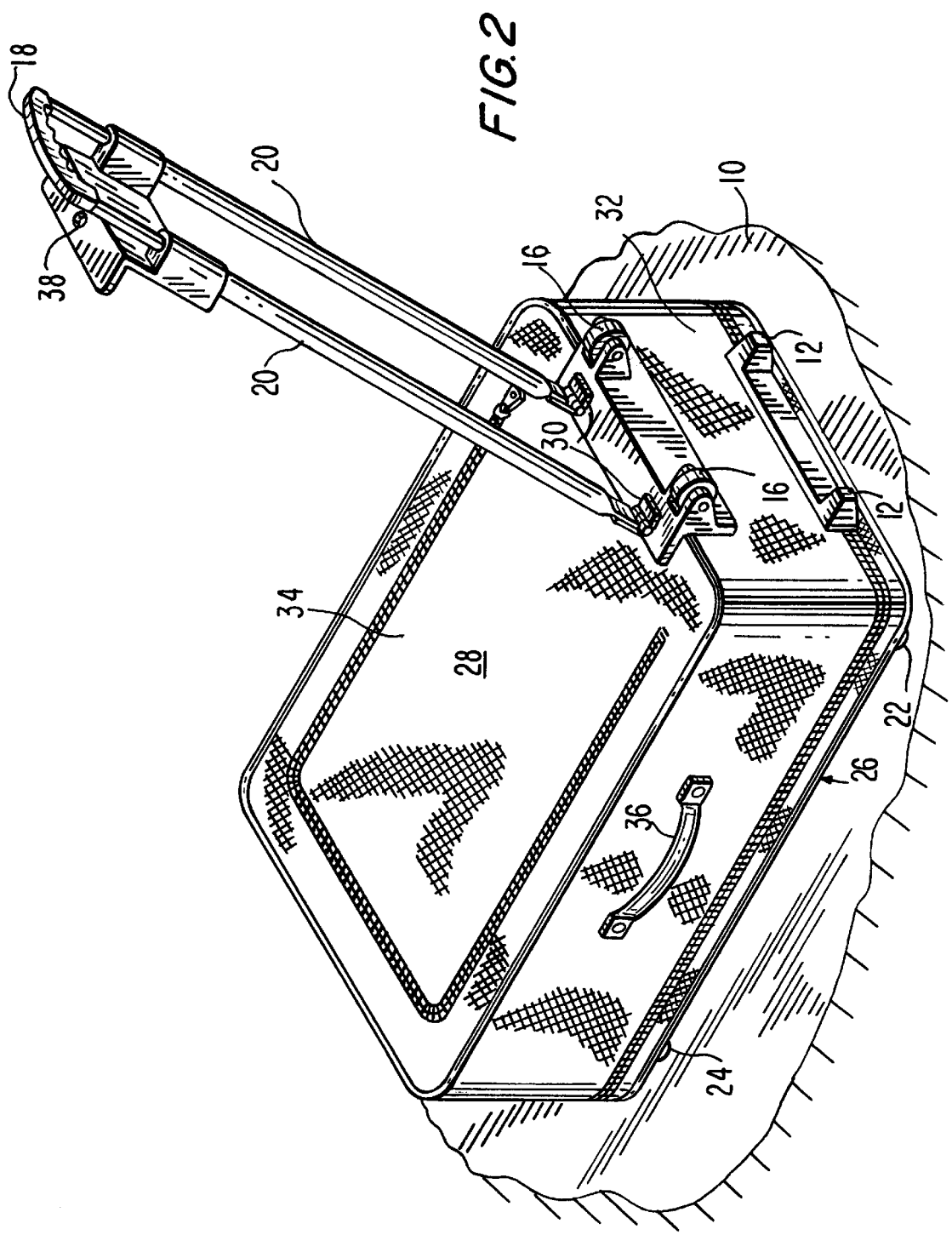
FIG. 2 is a rear perspective view of the wheeled carrying case of FIG. 1, in which a handle structure of the carrying case has been hinged relative to a major wall of the carrying case, and, the carrying case has been laid on the ground engageable surface ready for towing of the carrying case.

As shown in FIGS. 1 and 2, the wheels 22 and 24 are mounted on a front wall 26 of the case. As well, the handlebar 18 and its supporting telescopic legs 20 are mounted externally of the carrying case on the opposed back wall 28 of the case, with the legs 20 hinged in any convenient manner such as shown at 30, such that the entire handlebar and telescopic leg assembly is swingable, as illustrated in FIG. 2, relative to the body of the carrying case 14 from a position in which it overlies the back wall 28, to a position in which it extends at an angle to the back wall 28. Conveniently, the hinged attachment 30 of the handlebar and telescopic leg assembly 20 can be located adjacent an end wall 32 of the carrying case and the back wall 28 can be provided with a removable zippered closure 34, to enable loading of the articles to be carried within the carrying case.

Conveniently, the carrying case can be provided with a side handle 36, that in addition to being employed for hand carrying or manipulation of the case, also can be employed for reorienting the carrying case into a position in which the wheels 22 and 24 are engaged with the supporting ground surface.

Referring again to the embodiment of FIG. 1, when the handlebar 18 and its supporting telescopic legs 20 are in the retracted position, one or multiple of handle 36 can then be employed to tilt the carrying case on to the ground engaging feet 12 to lower the front wall 26 into engagement with the supporting ground surface 10. Thereafter, a release button 38 associated with the handlebar 18 and its supporting telescopic legs 20 is actuated to release the handlebar 18 from its releasable engagement with the end wall 40 of the carrying case. As shown in FIG. 2, the handle 18 is then swung upwardly and over the then upwardly presented back wall 28 of the carrying case, in order to position the handlebar in an orientation ready for towing of the carrying case over the ground surface 10, as is accommodated by the ground engaging wheels 22 and 24.

Conveniently, the front wall 26 of the carrying case 40 can be made of a flexible material, such as is common in the art, or alternatively, the entire back wall can be made of a structurally rigid material such as molded plastic, metal or a plywood substrate can be used to support the flexible outer covering material. If a flexible material is used for the formation of the back wall 26, then a probability exists that the back wall will bulge outwardly at the time the case is positioned horizontally for towing.

If the outward bowing of the front wall 26 is sufficient to cause the center of the front wall to contact the ground surface 10, the center of the front wall 26 might be abraded or otherwise damaged during towing. To avoid this from happening, a center caster 40 may be employed, preferably, in the form of an omni-directionally rotatable ball which is mounted on the front wall 26 at the center of the front wall 26.

As shown in FIG. 1A, the center caster 40 is of lesser height than the height of the ground engaging wheels 22 and 24 as shown by vertical line 43. At maximum height, a center caster 41 (shown in dotted lines) can be of equal height to the height of the ground engaging wheels 22 and 24.

Further, if the front wall 26 is formed of a flexible material, it is also preferably that a frame be incorporated into the luggage, with the frame providing a support for the ground engaging wheels 22 and 24, and also for the center caster 40.

Conveniently, and to reduce the weight of the carrying case, the frame supporting the wheels 22 and 24 and also the center caster 40 can be in the form of an X-frame, as indicated in dotted lines 42 in FIG. 1 of the drawings.

In the event that one of the sets of ground engaging wheels 22 and 24, for example wheels 22, are rotatable about fixed axes, then, the other wheels 24 can be in the form of casters, that can angle relative to the wheels 22. The combination of wheels rotatable about a fixed axis and caster wheels will allow for omnidirectional movement of the carrying case over the ground surface 10 under the control of the handlebar and its supporting telescopic legs 20.

In lieu of telescoping legs 20, the legs 20 can be tubes of fixed length that are hinged at their ends opposite the handlebar 18 to the end wall 32 of the case by the hinges 30.

The structure described with respect to FIG. 1 and 2 results in the handlebar 18 and its supporting legs 20 being positioned exteriorly of the is carrying case 14. While this has the advantage of providing the maximum internal capacity of the carrying case, internal mounting is also possible, such as illustrated in FIGS. 3 and 4.

Figure 4:
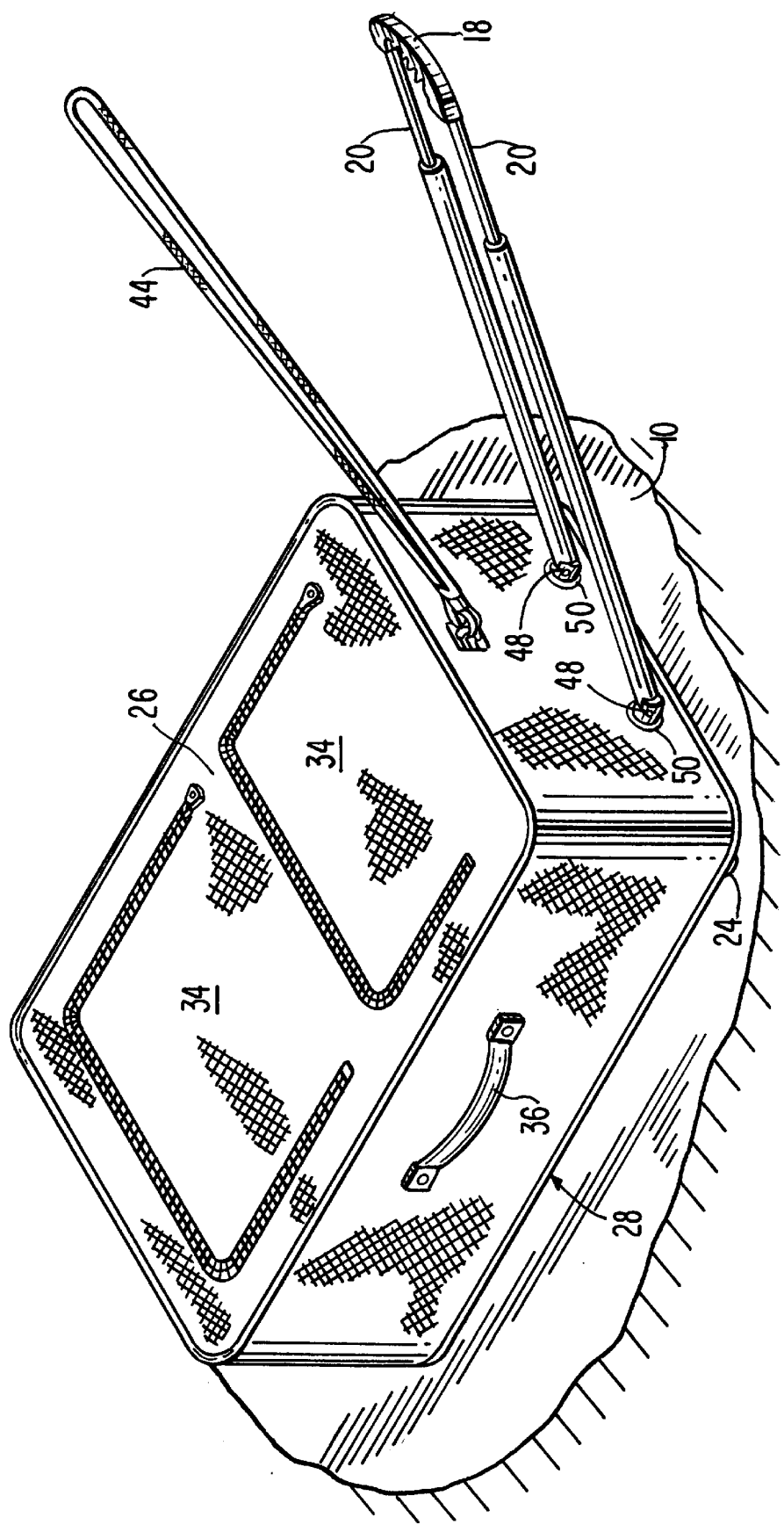
FIG. 4 is a frontal perspective view corresponding with FIG. 2, and showing the wheeled carrying case of FIG. 3 in a position ready for towing of the case over a supporting ground surface; and, FIG. 5 is a frontal perspective view corresponding with FIG. 4, and showing the carrying case of FIG. 4 when employed for transporting auxiliary articles of luggage, the carrying case then acting as a pallet to which the articles of auxiliary luggage can be detachably attached.
Figure 5:
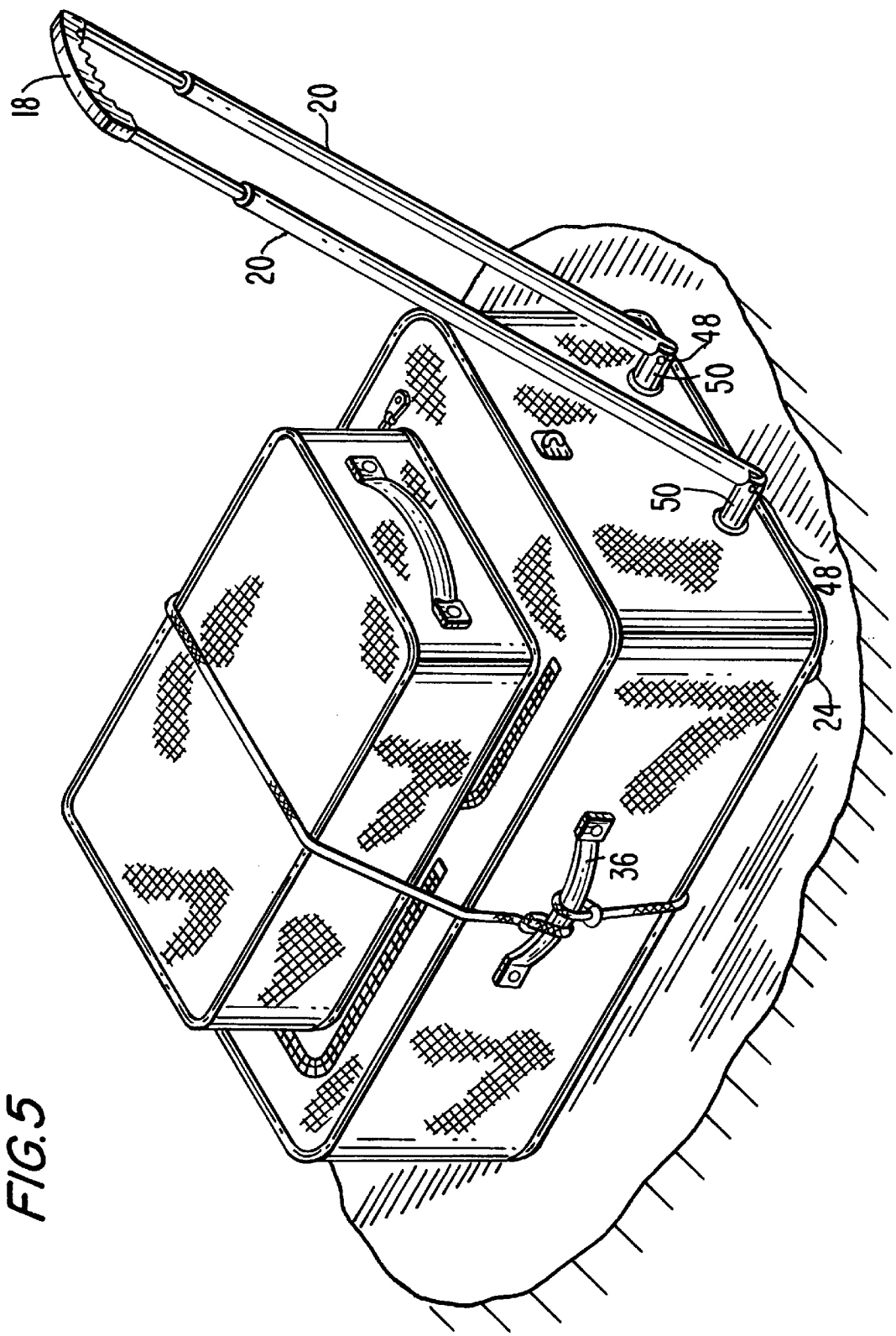

In FIGS. 3 and 4, the handlebar 18 and its associated telescopic legs, instead of being positioned adjacent the front wall 26 of the carrying case are positioned internally of the carrying case and adjacent the back wall 28. Also as illustrated, the rigid handlebar and leg arrangement can be supplemented, or indeed eliminated and replaced by a towing strap 44 which can be stored when not needed in a pocket 46 secured to a side wall of the carrying case.

The positioning of the telescopically extendable legs 20 for them to be guided within the case and adjacent the back wall 28 of the case carries with it the requirement that the legs 20, when retracted, can only extend parallel to the back wall 28 of the case in the manner of the conventional carrying case. To permit upwards orientation of the handlebar relative to the ground surface 10, the respective legs 20 can be hingedly connected at 48 to the leg portions 50 that are slidable within the body of the case, and, which are held captive within the body of the case at the time the main handlebar 18 and its supporting legs 20 are extended from the case.

In FIGS. 6 to 13, the handlebar 18 and its supporting legs 20 are replaced by a linear member 52 comprised of a plurality of telescoping sections 54, 56 and a handgrip 58. The handle 60 shown in FIGS. 6 to 12 is shown in its fully retracted position within the carrying case 14 in FIG. 6, and the linear member 52 and its associated end section 50 are contained within a tubular member 62 located within the carrying case 14 and attached to the back wall 28. In this fully retracted position, the handle 60 is locked in place by a latch 64 pinned to the handgrip 58 at one end and seated in a groove 66 in a boss 68 which is integral with the tubular member 62 and is fixedly attached to the carrying case 14. The latch 64 is held firmly in groove 66 by the spring 74 which biases a first button 72 and by a spring 67 loaded second button 69 pinned to a lever arm 73 fitting between and contacting the boss 68 and the underside 75 of the handgrip 58. The linear member 52 passes through an aperture 70 in the boss 68. Pressing down 71 on the first button 72, which is located on the top of the handgrip 58 over the linear member 52, releases 77 the latch 64 from the groove 66, allowing a first telescoping section 56 to be extended to its full length.

Further extension of the linear member 52 is prevented by the lever arm 73 which extends far enough to obstruct the top of a wall of a second telescoping section 54 from extension, but not far enough to contact the first telescoping section 56. In this position where only the first telescoping section 56 is extended, the case 14 can only be carried in an attitude inclined from the vertical with respect to the supporting surface on its towing wheels 16.

To extend the second telescoping section 54, the second button 69 is depressed 76 with the result that the lever arm 73 is lifted 78. FIG. 11A shows an exemplary detail of an arrangement whereby the lever arm 73 can be lifted 78 when the second button 69 is depressed 76. When the second button 69 is depressed 76, the lever arm 73 is lifted 78 by the corner 65 of the boss 68. When the second button 69 is released, a torsion spring 67 surrounding the pin 79 connecting the second button 69 and the lever arm 73 acts to restore the lever arm 73 to a horizontal position.

FIG. 11B shows another exemplary detail of an arrangement whereby the lever arm 73 can be lifted 78 when the second button 69 is depressed 76. FIG. 11B shows the pin 79, which attaches the lever arm 73 to the second button 69, and the hole 81 in the second button 69 and the lever arm 73, through which hole 81 the pin 79 passes. The cams 83, 85 on the pin 79 and the hole 81, respectively, convert the downward motion of the second button 69 when depressed into rotational motion of the pin 79 counterclockwise, raising the lever arm 73 mounted on the pin 79, and convert the upward motion of the second button 69 when it is released after depression into clockwise rotation of the pin 79, lowering the lever arm 73 mounted on the pin 79. The pin 79 is fixed with respect to the lever arm 73 by a second pin 87 or other fixing means.

An alternative arrangement. to that using the latch 64 is shown in FIG. 7A. A rod 78 is connected to the spring 74 beneath the first button 72. The rod 78 travels vertically down and up within the first telescoping section 56 as the first button 72 is depressed and released. The rod 78 is adapted to contact a tube 82 mounted in first telescoping section 56 near the free end of the rod 78. The tube 82 is loaded with a spring biased ball bearing 84. When the first button 72 is not depressed, the ball bearing 84 is seated in an aperture 86 in the second telescoping section 54 by the contact of the rod 78 with the tube 82, thus locking the first telescoping section 56 against vertical movement. When the first button 72 is depressed, the ball bearing 84 can be moved out of the aperture 86 since the rod 78 no longer contacts the tube 82, allowing vertical extension of the first telescoping section 56. A multiplicity of apertures 86 may be located in the second telescoping section 54 to allow multiple "locking points" for the first telescoping section 56 as it extends since the ball bearing 84, by virtue of its spring biasing, will become seated in each of the apertures 86 as the rod 78 contacting the tube 82 moves vertically upward along with the first telescoping section 56 in which the rod 78 is mounted. By depressing the first button 72 on each such occasion of locking, the ball bearing 84 will become unseated from the aperture 86 in which it is seated, allowing further extension of the first telescoping section 56. An alternative structure to that which is described in this paragraph is disclosed in our copending application Ser. No.

09/005,313, filed on Jan. 9, 1998, which is incorporated by reference in this application, especially on page 18, line 17 through page 19, line 20 and in FIGS. 7A, 7B, and 7D of that copending application.

The structure of the second button 69 is the same as shown in FIG. 7 and as described with reference thereto except for the elbow and rod arrangement 88 attached to the bottom flange 90 of the second button 69. The elbow and rod arrangement 88 carry a tube 92 loaded with a spring biased ball bearing 94. The rod 96 travels vertically down or up between the tubular member 62 and the second telescoping section 54 when the second button 69 is depressed or released, respectively. When the second telescoping section 54 is unextended, the ball bearing 94 is seated in one of the apertures 86 in the second telescoping section 54, adding its locking effect to that of the lever arm 73 previously described. Pressing the second button 69 after the first telescoping section 56 is fully extended will raise the lever arm 73 as previously described and will also unseat the ball bearing 94 from the aperture 86 in which it was located, thus allowing extension of the second telescoping section 54. Analogously to the possibility outlined above for the first telescoping section 56 in FIG. 7A, multiple "locking points" can be introduced at different lengths of extension of the second telescoping section 54 by a multiplicity of apertures 86 in and along the length of the second telescoping section 54. If such a multiplicity of apertures 86 is introduced in the second telescoping section 54, the ball bearing 94 will become seated in each of the apertures 86 as the second telescoping section 54 is extended, locking the section repeatedly. By depressing the second button 69 on each such occasion of locking, the ball bearing 94 will become unseated from the aperture 86 in which it is seated, allowing further extension of the second telescoping section 54. An alternative structure for producing multiple "locking points" at different lengths of extension of the second telescoping section 54 is disclosed in our copending application Ser. No. 09/005,313, filed on Jan. 9, 1998, especially in FIGS. 7A, 7C, and 7E of that copending application.

As can be deduced from the above description and the drawings, the same apertures 86 in the second telescoping section 54 can be used to seat both ball bearings 84, 94 and thus to serve as multiple "locking points" for both the first telescoping section 56 and the second telescoping section 54. The arrangement shown in FIGS. 7A to 7C allows as many degrees of lockable extension of the handle 60 as the number of apertures 86 which are provided in contradistinction to the arrangement shown in FIG. 7 which only allows one degree of lockable extension, namely, the condition existing when the first telescoping section 56 is fully extended, and the second telescoping section 54 is still unextended.

For either the arrangement of FIG. 7 or that of FIGS. 7A to 7C, when the second telescoping section 54 is fully extended, the associated end section 50 will be partially exposed on the outside of the case 14.

FIG. 13 shows the end section 50 connected to the second telescoping section 54 by a socket type hinge 98 restricting rotation 100, 102 of the handle to a plane substantially perpendicular to the back wall 28 of the carrying case 14 when the case 14 is laid on its back wall 28 on a supporting surface, and to a plane of substantially the same inclination to the horizontal as the inclination of the handle 60 also when the case 14 is laid on its back wall 28. The hinge 98, thus, allows extensive maneuverability of the handle 60 when the case 14 is laid on its back wall 28, without allowing rotation of the handle 60 about its longitudinal axis 104. This extensive maneuverability of the handle 60 allows a person to guide the case 14 in substantially any direction including around curved paths of varying radii of curvature.

Alternatively, FIG. 15 shows the end section 50 connected to the second telescoping section 54 by socket type hinge 104 restricting rotation 100 of the handle 60 to a plane substantially perpendicular to the back wall 28 of the carrying case 14 when the case 14 is laid on its back wall 28 on a supporting surface.

Optionally, and as illustrated in FIG. 1, the front wall 26 can also be detachably attached to the body of the carrying case 14 by a zippered connection therewith as indicated at 34 in FIG. 1. This will permit the front wall 26 with its attached ground engagable wheels 22 and 24 and the center caster 40 to be entirely removed from the carrying case in the event that it is not deemed needed for a particular use or if replacement, repair, or cleaning of the surface is desired. If desired, access to the interior of the carrying case can be provided by a zippered closure located underneath the front wall 26. Alternatively, the zippered closure can be provided on the back face 28 of the carrying case, in which event the handle 18 and its legs 20 can also be made removable from the body of the carrying case.

Numerous alternative modifications will suggest themselves to persons skilled in the art, and are included within the scope of the appended claims.

What is claimed is:

1. An article of towable luggage, including a body having a major front wall, a major rear wall, and side walls extending peripherally of said major front and rear walls and supporting said major front and rear walls in spaced relation; the improvement comprising:

wheels mounted on one of said major front and rear walls permitting towing of said article over a ground surface in proximity to and supported on said ground surface by said wheels, said one of said major front and rear walls having a greater surface area than any of said side walls;

a means for strengthening said one of said major front and rear walls, said means for strengthening not being extended to strengthen any portion of said side walls, said means for strengthening being inside of said article;

a retractable and extensible handle;

a means for locking said handle in at least one degree of extension; and a means for attachment of said handle to said body of said article, said means for strengthening including at least one component distinct from said means for attachment, said means for attachment allowing rotation of said handle in at least one certain plane, two of said side walls being spaced apart from a width dimension of said handle and on opposite sides of said width dimension, each of said two of said side walls forming a four-sided polygon, wherein said handle has legs, said legs being slidably received within said article.

2. The article of claim 1, in which said legs are slidable into said article through a side wall thereof, and which further comprises a means for attachment of said legs to said body of said article, said means for attachment including a hinge permitting pivoting of said legs and said handle into a position for towing said article.

3. The article of claim 2, in which said legs are telescopic legs, said means for attachment further including a stop member prohibiting removal of each said leg entirely from within said article.

4. An article of towable luggage, including:

a body having a major front wall, a major rear wall, and side walls extending peripherally of said major front and rear walls and supporting said major front and rear walls in spaced relation;

at least one means for moving said article;

a means for attachment of each of said at least one means for moving to said body of said article;

wheels mounted at least on one of said major front and rear walls, said wheels permitting towing of said article over a surface with at least one of said wheels in proximity to and supported by said surface, said one of said major front and rear walls having a greater surface area than any of said side walls; and a means for strengthening said one of said major front and rear walls, said means for strengthening not being extended to strengthen any portion of said side walls, said means for strengthening including at least one component distinct from said means for attachment, said means for strengthening being inside of said article, two of said side walls being spaced apart from a width dimension of one of said at least one means for moving said article and on opposite sides of said width dimension, each of said two of said side walls forming a four-sided polygon, wherein said at least one means for moving said article includes a handle having legs, said legs being slidably received within said article of towable luggage through a side wall thereof, said means for attachment including a hinge permitting pivoting of said legs and said handle into a position for towing said article.

5. The article of claim 4, in which said legs are telescopic legs, said means for attachment further including a stop member prohibiting removal of each said leg entirely from within said article.

6. The article of claim 5, wherein said wheels mounted at least on said one of said major front and rear walls include at least two surface engaging wheels rotatable about at least one fixed axis, said surface engaging wheels being mounted on one of said side walls.

7. A method for propelling said article of towable luggage of claim 6, comprising the steps of:

a. positioning said article at a first orientation relative to the surface such that said one of said side walls is substantially parallel to the surface and nearer to the surface than any other of said side walls;

b. extending said telescopic legs;

c. tilting said article from its first orientation relative to the surface such that said surface engaging wheels mounted on said one of said side walls contact the surface and no other part of said article contacts the surface; and d. propelling said article relative to the surface by exerting a force on said handle while said article is tilted from its first orientation.

8. A method for propelling said article of towable luggage of claim 5, comprising the steps of:

a. fully extending said telescopic legs;

b. positioning said article at a first orientation relative to the surface such that said wheels mounted on said one of said major front and rear walls contact the surface;

c. pivoting, by means of said hinge, said legs and said handle into a position for propelling said article; and d. propelling said article relative to the surface by exerting a force on said handle while said article is at said first orientation.

9. An article of towable luggage, including:

a body having a major front wall, a major rear wall, and side walls extending peripherally of said major front and rear walls and supporting said major front and rear walls in spaced relation;

at least one means for moving said article;

a means for attachment of each of said at least one means for moving to said body of said article;

wheels mounted at least on one of said major front and rear walls, said wheels permitting towing of said article over a surface with at least one of said wheels in proximity to and supported by the surface, said one of said major front and rear walls having a greater surface area than any of said side walls; and a means for strengthening said one of said major front and rear walls, said means for strengthening not being extended to strengthen any portion of said side walls, said means for strengthening including at least one component distinct from said means for attachment, said means for strengthening being inside of said article;

two of said side walls being spaced apart from a width dimension of one of said at least one means for moving said article and on opposite sides of said width dimension, each of said two of said side walls forming a four-sided polygon, wherein said at least one means for moving said article includes a towing strap attached to said article, said towing strap being usable in towing said article over said surface, said at least one means for moving said article further including a handle, and wherein said means for attachment includes a pivotal attachment to said article adjacent to one of said side walls, said handle being swingable from a position extending substantially parallel to one of said major front and rear walls of said article to a position inclined to said article and operable to facilitate towing of said article.

10. An article of towable luggage, including:

a body having a major front wall, a major rear wall, and side walls extending peripherally of said major front and rear walls and supporting said major front and rear walls in spaced relation;

at least one means for moving said article;

a means for attachment of each of said at least one means for moving to said body of said article;

wheels mounted at least on one of said major front and rear walls, said wheels permitting towing of said article over a surface with at least one of said wheels in proximity to and supported by the surface, said one of said major front and rear walls having a greater surface area than any of said side walls; and a means for strengthening said one of said major front and rear walls, said means for strengthening not being extended to strengthen any portion of said side walls, said means for strengthening including at least one component distinct from said means for attachment, said means for strengthening being inside of said article, two of said side walls being spaced apart from a width dimension of one of said at least one means for moving said article and on opposite sides of said width dimension, each of said two of said side walls forming a four-sided polygon, wherein said at least one means for moving said article includes a towing strap attached to said article, said towing strap being usable in towing said article over the surface, said at least one means for moving said article further including a handle, wherein said means for attachment includes a pivotal attachment to said article adjacent to one of said side walls, said handle being swingable from a position extending substantially parallel to one of said major front and rear walls of said article to a position inclined to said article and operative to facilitate towing of said article, and wherein said article further includes extensible legs interposed between said handle and said pivotal attachment.

11. An article of towable luggage, including:

a body having a major front wall, a major rear wall, and side walls extending peripherally of said major front and rear walls and supporting said major front and rear walls in spaced relation;

at least one means for moving said article;

a means for attachment of each of said at least one means for moving to said body of said article;

wheels mounted at least on one of said major front and rear walls, said wheels permitting towing of said article over a surface with at least one of said wheels in proximity to and supported by the surface, said one of said major front and rear walls having a greater surface area than any of said side walls; and a means for strengthening said one of said major front and rear walls, said means for strengthening not being extended to strengthen any portion of said side walls, said means for strengthening including at least one component distinct from said means for attachment, said means for strengthening being inside of said article, two of said side walls being spaced apart from a width dimension of one of said at least one means for moving said article and on opposite sides of said width dimension, each of said two of said side walls forming a four-sided polygon, wherein said at least one means for moving said article includes a handle having legs, said legs being slidably received within said article, and wherein said wheels include at least two wheels rotatable about at least one fixed axis, and at least one caster wheel.

12. An article of towable luggage, including:

a body having a major front wall, a major rear wall, and side walls extending peripherally of said major front and rear walls and supporting said major front and rear walls in spaced relation;

at least one means for moving said article;

a means for attachment of each of said at least one means for moving to said body of said article;

wheels mounted at least on one of said major front and rear walls, said wheels permitting towing of said article over a surface with at least one of said wheels in proximity to and supported by the surface, said one of said major front and rear walls having a greater surface area than any of said side walls; and a means for strengthening said one of said major front and rear walls, said means for strengthening not being extended to strengthen any portion of said side walls, said means for strengthening including at least one component distinct from said means for attachment, said means for strengthening being inside of said article, two of said side walls being spaced apart from a width dimension of one of said at least one means for moving said article and on opposite sides of said width dimension, each of said two of said side walls forming a four-sided polygon, wherein said at least one means for moving said article includes a handle having legs, said legs being slidably received within said article through a side wall thereof, said means for attachment including a hinge permitting pivoting of said legs and said handle into a position for towing said article, and wherein said wheels include at least two wheels rotatable about at least one fixed axis, and at least one caster wheel.

13. An article of towable luggage, including a body having a major front wall, a major rear wall, and side walls extending peripherally of said major front and rear walls and supporting said major front and rear walls in spaced relation; the improvement comprising:

wheels mounted on one of said major front and rear walls permitting towing of said article over a ground surface in proximity to and supported on the ground surface by said wheels;

a means for strengthening said one of said major front and rear walls, said means for strengthening not being extended to strengthen any portion of said side walls, said means for strengthening being inside of said article;

a means permitting access to an interior of said body, said means being located on a wall of said major front and rear walls opposite said one of said major front and rear walls;

a retractable and extensible handle attached to said body, said handle being located adjacent to said one of said major front and rear walls, wherein said handle has legs, said legs being slidably received within said article through a side wall thereof; and means for attachment of said legs to said body of said article, said means for attachment including a hinge permitting pivoting of said legs and said handle into a position for towing said article.

14. The article of claim 13, wherein said handle is attached by a pivotal attachment to said article adjacent to one of said side walls, said handle being swingable from a position extending substantially parallel to one of said major front and rear walls of said article of towable luggage to a position inclined to said article and operative to facilitate towing of said article.

15. The article of claim 14, further including extensible legs interposed between said handle and said pivotal attachment.

16. The article of claim 13, which said legs are telescopic legs, said means for attachment further including a stop member prohibiting removal of each said leg entirely from within said article.

* * * * *